Aug. 14, 1951  V. N. JOHNSON  2,563,845
FULL-VIEW CAB FOR TRACTORS AND ROAD MACHINES
Filed Jan. 7, 1949  2 Sheets-Sheet 1

INVENTOR.
VIRGIL N. JOHNSON,
BY
McMorrow, Berman & Davidson
ATTORNEYS.

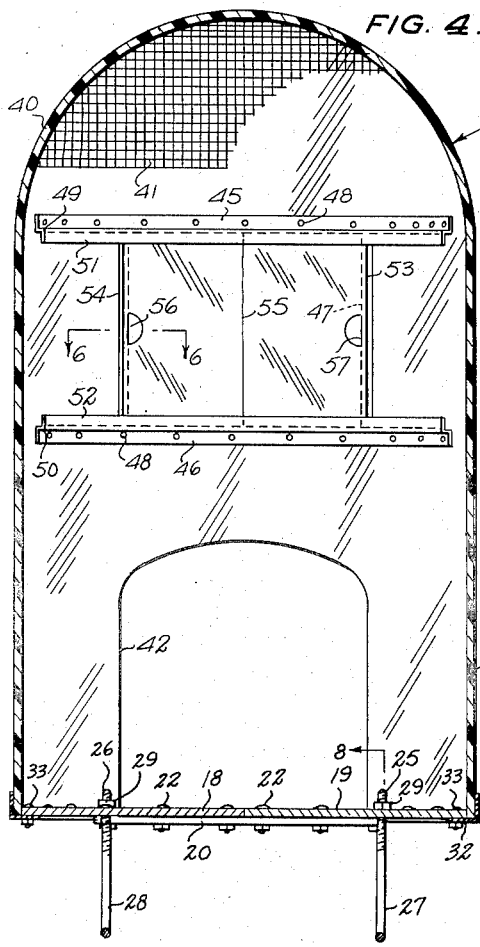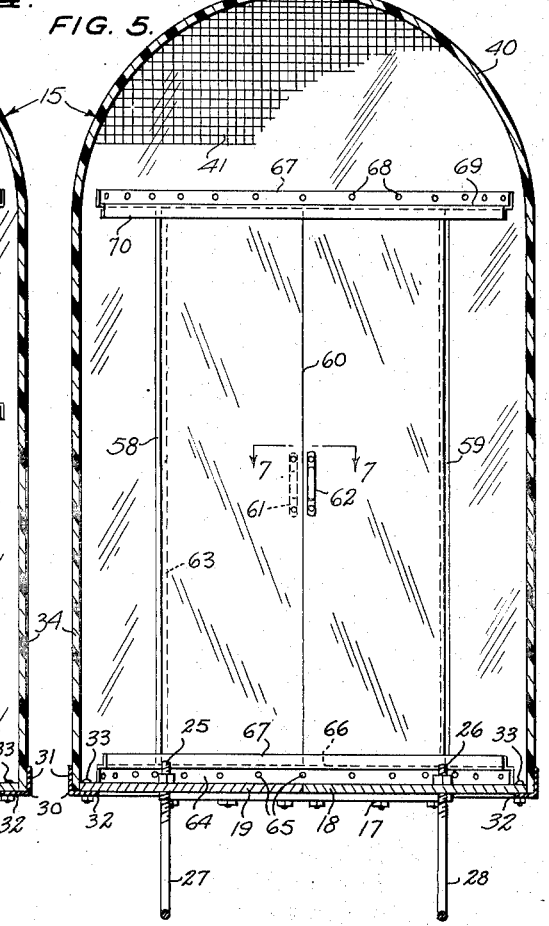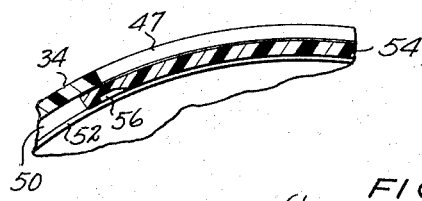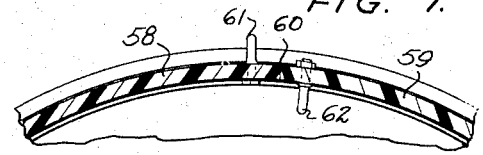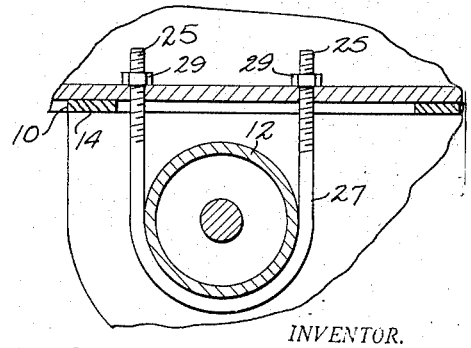

Patented Aug. 14, 1951

2,563,845

UNITED STATES PATENT OFFICE 2,563,845

FULL-VIEW CAB FOR TRACTORS AND ROAD MACHINES

Virgil Neil Johnson, Borup, Minn.

Application January 7, 1949, Serial No. 69,725

2 Claims. (Cl. 296—28)

1

This invention relates to tractor cabs and the like, and particularly to what may be termed a full-view cab for tractors and road vehicles.

The main object of my invention is to provide a tractor or road machine with means for protecting the operator from the elements without obstructing his view of the surroundings.

Another object is to provide a protecting cab designed to form a standard unit adapted to fit upon various types of tractors and the like, and which is so constructed as to provide convenience both in the operation of the machine fitted therewith and in the operation of portions of the cab itself, as well as compactness in form of the cab.

A further object is to make the body of the cab of transparent material and in such form as to provide a substantially unobstructed view through the walls thereof in all directions to facilitate maneuvering the machine or vehicle involved.

It is also an object to have such a cab which is simple to make and apply, reasonable in cost and effective in use.

Other objects and advantages of the invention will appear in further detail as the specification proceeds.

In order to facilitate ready comprehension of this invention for a proper appreciation of the salient features thereof, the invention is illustrated on the accompanying drawings forming part hereof, and in which:

Figure 4 is a vertical section taken on line 4—4 in Figure 2;

Figure 5 is another vertical section taken on line 5—5 in Figure 2;

Figure 6 is an enlarged fragmentary section taken on line 6—6 in Figure 4;

Figure 7 is an enlarged fragmentary section taken on line 7—7 in Figure 5;

Figure 8 is an enlarged section taken on line 8—8 in Figure 4.

Throughout the views the same reference numerals indicate the same or like parts.

Figure 1:
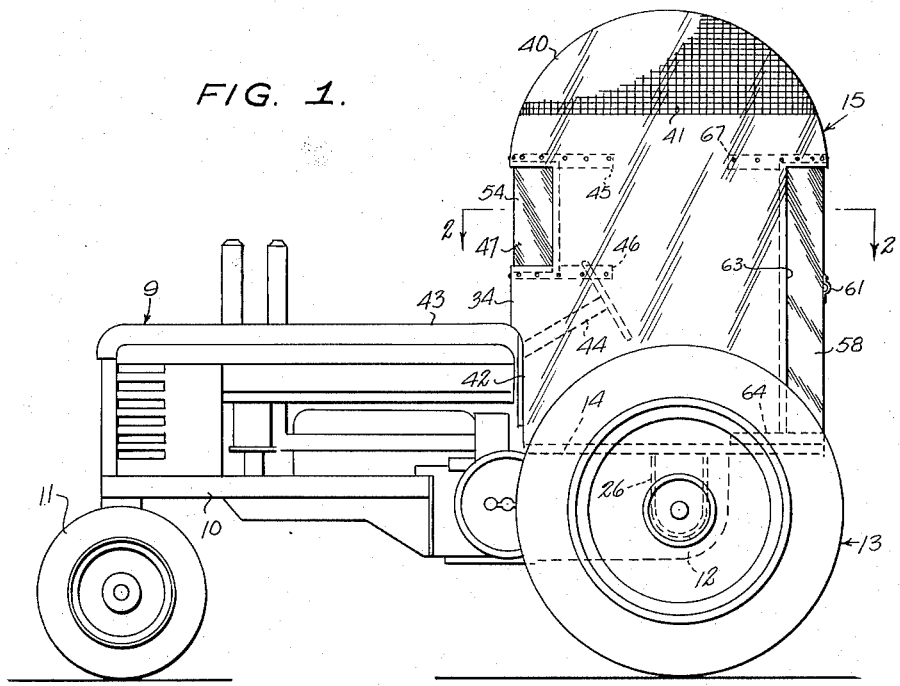
Figure 1 is a side elevation of a tractor having a cab made according to the invention applied thereto.

Upon tractors, road machines and the like the driver's seat is usually exposed to the elements and without shelter, dashboard, or protection of any kind, inasmuch as the vehicle is not intended for transportation, but for power operation of some kind. However, it is frequently desirable, or even necessary, to operate the tractor or road machine in bad weather, and sudden squalls or showers may occur when the machine involved is operated, and hence, it is desirable to have some type of shelter for the operator. I am aware that certain means for sheltering the operator have been applied to certain tractors, but these have proved to be makeshifts, inasmuch as they have introduced an unforseen difficulty, namely, that visibility has been so seriously cut down that the operator has no longer been in a position to freely maneuver his machine because of his limited view.

Upon considering this problem, it has occurred to me that it should be possible to have a protecting cab mounted upon a tractor or road machine which not only completely protects the operator, but also affords substantially the same unobstructed view of his surroundings as though the cab were not in position upon the machine, inasmuch as various materials are now available which make such construction possible. As a result, I have found it quite feasible to produce a cab of the indicated character as will now be more fully described.

Hence, in the practice of my invention, and referring again to the drawings, a tractor, generally indicated at 9, is provided with a frame 10 having the forward portion thereof supported on wheels 11 while being rearwardly provided with an axle 12 having the rear wheels 13 mounted thereon, with the rear portion of the frame presenting a substantially flat rear platform therebetween, as indicated at 14. The tractor thus far described scarcely needs to be detailed further and forms a locale for the invention which primarily includes a cab, generally indicated at 15, which in turn includes a substantially circular floor indicated at 17 consisting of two opposite mating semi-circular members 18 and 19 secured together upon the under side thereof by means of a pair of transversely disposed, elongated cleats 20 and 21 held to the floor sections by means of bolts 22, 22. The cleats 20 and 21 are either of metal or wood, but preferably are of metal to be compact and unobtrusive. In the two floor sections 18 and 19 are pairs of corresponding holes 23, 23, 24, 24 through which the upper ends 25, 25, 26, 26 of a pair of U-bolts 27 and 28 are adapted to extend, being secured in position by nuts 29, 29, etc., screwed upon the mentioned upper ends of those bolts when the latter engage beneath the axle 12, as best seen in Figure 8, with respect to bolts 27. Thus, the bolts 27 and 28 serve to hold the floor 17 down upon the frame platform 14, of tractor frame 10.

Further means are provided for securing the two bottom sections together and also serve an additional purpose, for surrounding the periphery of the bottom is a circularly-bent angle member 30 having the upright wall 31 thereof uniformly spaced a short distance outside of the periphery of the floor as a whole, while the lower angle member 32 is substantially flat and secured to the floor by means of bolts 33, 33, etc. Thus, the angle member 30 virtually forms a ring secured to the floor and receiving the lower end of an upright, substantially cylindrical cab body 34 between the vertical arcuate walls 31 and the periphery of the floor in such position as to rest upon the flat ledge 32 of angle member 30. The wall of the cab is secured to the upright portions of the angle member by means of a plurality of upright, threaded rods or studs 35, 35, welded, as indicated at 36 in Figure 3, to the upright, arcuate wall portion 31 of angle member 30. The upper threaded ends 37 of studs 35 extend through the corresponding series of angle members 38 secured to the wall of cab 34 by means of screws, bolts, or by cementing or fusing the same thereto, the angle member 38 serving as a clamp in cooperation with stud 35 in each case and a nut 39 being screwed upon the upper threaded end 37 thereof and engaging upon angle member 38 associated with each stud.

Preferably, the wall of the cylindrical cab 34 is made of transparent plastic material of the class of methacrylate resins or a styrene compound, and at the upper end thereof is formed into a closed dome which is preferably painted or enameled upon the inside at 41 to render the dome opaque and provide a shelter from direct sunlight for the operator. On the side of the cab which faces forward, the lower portion has an opening 42 which fits over the rear end of the fuel tank 43 in such fashion that a steering post 44 projects rearwardly into the cab through the opening, as best seen in Figure 1.

Above the mentioned forward opening are secured a pair of rails 45, 46 above and below a window opening 47, respectively, the rails being preferably secured to the inside of the cab by means of bolts or rivets 48, 48 and extending a distance beyond each end of the window opening. Each rail has an inwardly-extending angle portion, as indicated at 49, 50, the mentioned inwardly-extending portions being provided with mutually opposite flanges 51, 52 for receiving and slidably retaining in position a pair of arcuate corresponding plastic windows 53, 54 normally adapted to meet at a common junction 55 and both provided at their outer ends with finger notches 56, 57 by which to slide these window members apart along rails 45 and 46, in order to expose opening 47 above the steering post.

Figure 3:
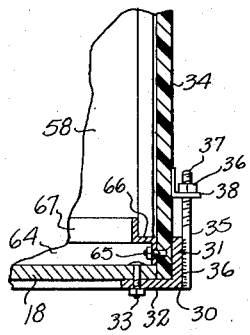
Figure 3 is an enlarged fragmentary detail section taken on line 3—3 in Figure 2.

Directly opposite the window structure just described are located a pair of arcuate plastic doors 58 and 59, as best seen in Figure 5, meeting at a vertical median line 60 when closed, the door 58 having an external handle 61, while door 59 is provided with an inwardly-projecting handle 62 accessible to the operator when he is within the cab. These doors occupy the rear opening 63. At the bottom of the opening 63 is fixed a rail 64 of arcuate form, being fixed to the wall of the cab body 34 by means of rivets or bolts 65 and provided with a ledge portion 66, all as best seen in Figure 3, the doors resting slidably upon the mentioned ledge portion 66, while within the doors is an upwardly-extending flange 67 retaining the doors slidably against the portions of the cylindrical wall of the cab body 34 with which they come in contact. In similar fashion, above the upper end of door opening 63 is fixed a top rail 67 also secured by rivets or bolts 68 similar to the bolts 65 in the wall of the cab body, while an inwardly-extending ledge portion 69 overlies the upper ends of doors 58 and 59 and upon the inner edge of ledge 69 is a depending rigid flange 70 retaining the upper portions of the doors in contact with the cylindrical wall of the cab body 34. Both rails are of sufficient length to allow the doors to be slid to both sides to expose the door opening and allow the operator either to enter the cab or leave the same at will. When the operator is outside and the doors are closed, he grasps the handle 61 first and pushes door 58 aside and thereafter pushes door 59 to the other side, while on the other hand, if he is inside and the doors are to be opened, he grasps handle 62 and pushes door 59 first aside and thereafter pushes door 58 to the other side. Obviously, both the window members 53 and 54 and doors 58 and 59 are larger when taken together than the opening 47 in case of the window members and door opening 63 in connection with the doors. On the other hand, the window opening 47 extends substantially to the inner opposite edges of flanges 51 and 52 and not to the ledge portions 49 and 50, to provide marginal retaining portions for the window members 53 and 54. In similar fashion, the door opening 63 terminates above lower ledge 66 of rail 64 and approximately at the level of the upper edge of flange 67, while the upper end of the door opening terminates substantially at the lower edge of flange 70 on rail 67, in order to provide sufficient marginal guiding means forming part of the cylindrical wall of cab 34 to locate the doors against the flanges 67 and 70. In each case the window members and doors are arcuately slidable in a curved path substantially against the inner sides of the wall of cab 34.

The arrangement is such that when the driver or operator of the tractor slides the doors 58 and 59 aside and steps through door opening 63 into cab 34, he is immediately in a position to seat himself behind the steering post 44, the seat not being shown, as forming no part of the invention. He is then in a position to operate the tractor, and if the day happens to be cold or rainy, he merely shuts doors 58 and 59 behind him and he is entirely enclosed and protected from the weather. Should he desire to open the window before him, it is but the work of a moment to slide window members 53 and 54 aside in both directions, when he will be able to look directly through the opening into the field before the tractor.

Figure 2:
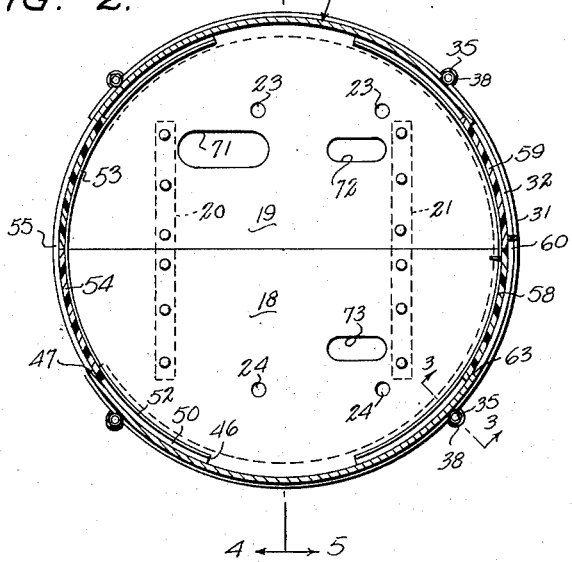
Figure 2 is an enlarged transverse section of the cab of Figure 1, taken on line 2—2.

While certain plastics have been mentioned as suitable material for the wall of cab body 34 with its dome portion 40 and similar plastics may be used for the window members 53 and 54 and doors 58 and 59, it is self-evident that I am not limited to those plastics mentioned, but may use any others which may be suitable for the purpose. In addition, the floor 17 formed of the two sections 18 and 19 may be made of plywood, plastic, or metal, and of any desired thickness, but if the platform 14 of the tractor or other vehicle, such as a road machine, is already provided in the form of a flat sheet metal floor, the wooden floor may be dispensed with and instead the annular angle member 30 may be bolted directly to the floor of such machine. Obviously, the floor, whether of metal or wood, as best shown in Figure 2, is preferably provided with openings 71, 72, 73 for the operating levers and pedals of the tractor or machine involved, such apertures being located in various positions according to the particular style or manufacture of such machine.

From the foregoing it is evident that an operator enclosed within the cab body 34 is able to view not only the scene immediately before the tractor, but the entire surroundings through the window members 53 and 54, the entire wall of cylindrical cab body 34, and also rearwardly through the doors 58 and 59, whether or not the window members or doors are open or partly closed or fully closed. On the other hand, he will be shielded from the sun by means of the opaque paint or enamel indicated at 41 on the inside of dome 40, and yet, with all, he will be protected from the weather whether it be cold, hot or full of precipitation.

Manifestly, variations may be resorted to and parts and features may be modified or used without others within the scope of the appended claims.

Having now fully described my invention, I claim:

1. A full-view cab for a tractor and the like including a substantially cylindrical upright cab body of transparent plastic material having a closed top, the cab body having a lower cutout portion upon one side thereof fitting over the rear end of the fuel tank on the tractor and having a window opening above the cutout portion and directly opposite the window opening and cutout portion, a door opening, a pair of substantially arcuate window members of transparent plastic material normally closing the door opening from within, means for slidably retaining the window members within said window opening and guiding said window members in an arcuate path of movement to and from said window opening, means for slidably retaining said doors within said door opening and guiding said doors in an arcuate path to and from said door opening, an annular angle member having a substantially flat horizontal ledge adapted to be secured to the frame of the tractor with the arcuate walls surrounding the lower end of said cylindrical cab body, upwardly-extending threaded studs fixed upon the arcuate wall of said angle member, a plurality of corresponding angle members upon the lower portion of the cab body having apertures through which the upper ends of said threaded studs extend with nuts screwed upon said upper ends to retain said cab body assembled with said annular angle member, said window members having finger notches adjacent to their remote inner extremities for moving said members, a door handle upon one door within said cab body, and a second door handle upon the other door disposed exteriorly of said cab body.

2. A full-view cab for a tractor and the like including a substantially cylindrical upright cab body of transparent plastic material having a closed dome-shaped and opaque top, the cab body having a lower cutout portion upon one side thereof fitting over the rear end of the fuel tank on the tractor, and having a window opening above the cutout portion and directly opposite the window opening and cutout portion, a door opening, a pair of substantially arcuate window members of transparent plastic material normally closing the window opening from within, a pair of substantially arcuate doors of transparent plastic material normally closing the door opening from within, a pair of substantially horizontal arcuate rails secured to the wall of said cab body above and below the window opening and having mutually-opposite retaining flanges slidably retaining the window members within said window opening and guiding said window members slidably in an arcuate path of movement to and from said window opening, said window members having finger notches adjacent to their remote inner extremities, a second pair of horizontal arcuate rails secured to the wall of said cab body above and below the door opening and having mutually-opposite retaining flanges slidably retaining the doors within said door opening and guiding said doors slidably in an arcuate path of movement to and from said door opening, a door handle upon one door within said cab body, a second door handle upon the other door disposed exteriorly of said cab body, an annular angle member having a substantially flat horizontal ledge adapted to be secured to the frame of said tractor and an arcuate upright flange surrounding the lower end of the cylindrical cab body, a plurality of upwardly-extending threaded studs secured upon the exterior of said arcuate flange in spaced-apart relation, corresponding angle members upon the exterior of said cab body having apertures through which the upper threaded ends of said studs extend with nuts screwed upon said upper ends engaging with said angle members in order to retain said cab body assembled with said annular angle member, a pair of semi-circular floor sections fitting within the lower end of said cab body and resting upon the horizontal ledge of said annular angle member and secured thereto, and a pair of transverse cleats beneath said semi-circular floor sections securing the latter together to form a circular floor for said cab body, the latter being normally disposed in a position upon the frame of said tractor to contain the controls thereof in accessible position to an operator when occupying the interior of said cab body.

VIRGIL NEIL JOHNSON.

REFERENCES CITED

The following references are of record in the file of this patent:

UNITED STATES PATENTS

| Number | Name | Date |
| --- | --- | --- |
| 92,964 | Ham | July 27, 1869 |
| 747,937 | Call | Dec. 29, 1903 |
| 1,919,387 | Stringer | July 25, 1933 |
| 2,052,471 | Hula | Aug. 25, 1936 |
| 2,479,036 | Campbell | Aug. 16, 1949 |

FOREIGN PATENTS

| Number | Country | Date |
| --- | --- | --- |
| 379,379 | Germany | Aug. 20, 1923 |

OTHER REFERENCES

"Transparent Top" in "Automotive Industries" of Aug. 15, 1939, page 185.

McCord Corp'n, advertisement in "SAE Journal" of March 1949, page 147.